Patented Dec. 5, 1922.

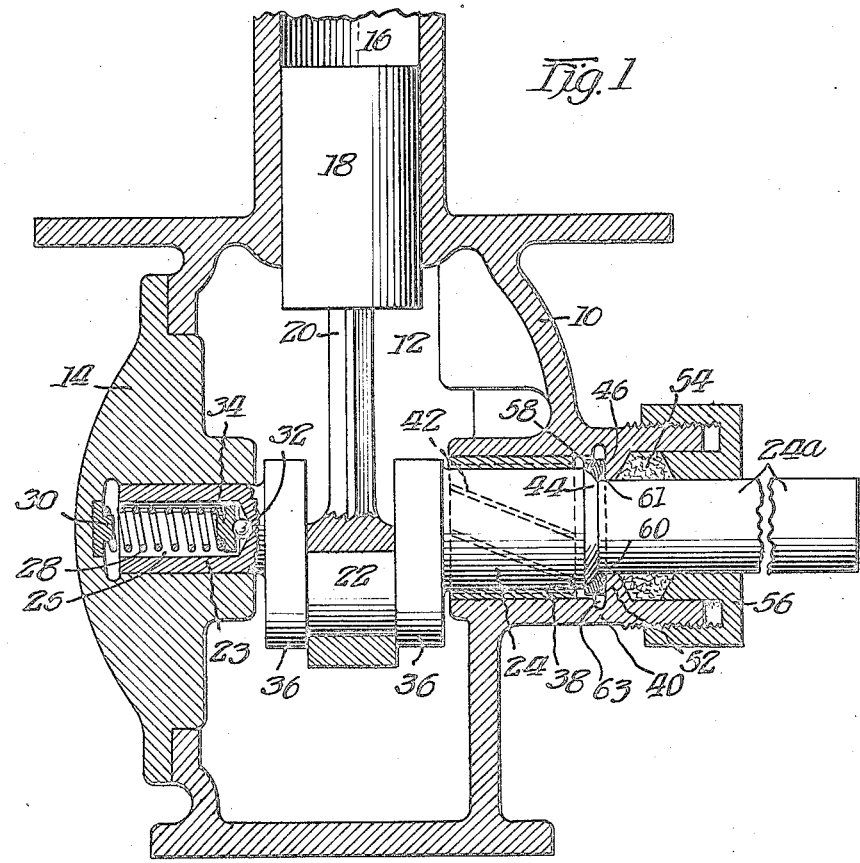

1,437,646

UNITED STATES PATENT OFFICE.

ALFRED O. GIRARD, OF CHICAGO, ILLINOIS, ASSIGNOR TO GLACIER REFRIGERATING MACHINE CO., A COMMON LAW TRUST, ALFRED O. GIRARD, TRUSTEE, OF CHICAGO, ILLINOIS.

PACKING RING.

Original application filed December 26, 1919, Serial No. 347,628. Divided and this application filed April 15, 1921. Serial No. 461,633.

*To all whom it may concern:*

Be it known that I, ALFRED O. GIRARD, a citizen of the United States, residing at Chicago, in the county of Cook and State of Illinois, have invented a certain new and useful Improvement in Packing Rings, of which the following is a specification.

This invention, which is a division of my prior application Serial Number 347,628, filed December 26, 1919, relates to a packing ring for especial use in crank shaft mountings for engines, ice machines, and the like in which it is necessary to prevent gas from traveling along the journals of the crank shaft into or out of the case (depending upon whether there is gas under pressure or a vacuum inside the crank case.)

The invention consists in the use in connection with a crank shaft passing thru a crank case wall; of a packing ring of peculiar construction held in place by spring mechanism to move the shaft so as to hold the ring in proper operating position under all conditions. The invention further consists in the details and features of construction to be hereafter more fully set forth in the specification and claims.

Referring to the drawings in which like numerals represent the same parts,

Figure 1 is a sectional view thru the crank case of an ice machine or engine, to which the device of this invention is especially applicable, in which the crank case is filled with gas under pressure which must be prevented from escaping from the case while the crank shaft is rotated.

Figure 2 is a face view of a washer of this invention in the preferred form looking at it from the left as viewed from Figure 1.

Figure 3 is a reverse view of the washer.

Figure 4 is an end view of the washer.

In the construction of Figure 1, the crank case proper includes the casting 10, having within it a crank case chamber 12 closed by a cap 14. This crank case chamber 12 opens into the cylinder 16 in which reciprocates the piston 18 driven by the connecting rod 20 attached to the crank pin 22 carried eccentrically of the crank shaft which comprises two end portions—one of them 22, journalled in the cap 14, the other 24—24$^a$ being journalled in the casting 10 as shown. The end 22 of the crank shaft does not reach the open air at any point and so does not require any special packing,—it is however, provided with a central chamber 26 within which lies a coil spring 28 bearing at one end on the block 30 in the cap 14, and at the other end bearing on an anti-friction ball 32 interposed between the bottom of chamber 26 and the block 34 and engaging the inner end or adjacent end of spring 28. The result of this construction is that the spring 28 urges the shaft mechanism to the right, as viewed in the drawings, and that the shaft can freely rotate on ball 32.

In prior devices it has been customary to provide some sort of packing for the shaft end 24—24$^a$ at a point immediately adjacent to the crank 36, but that construction is very unsatisfactory as it does not give its shaft end sufficient bearing or lubrication and it is impossible to make a seal satisfactory against ammonia or the like. For this reason such mechanism as shown in the drawing is provided in which the shaft portion 24 is of considerable length horizontally, and therefore has a substantial bearing on or thru the agency of a bushing 38 carried in the hub 40 of case 10. The bushing 38 about shaft portion 24 is provided with spiral oil slots or passages 42 to assist in carrying oil from within the crank case along the bushing. At the end of the elongated bearing thus formed, the shaft portion 24 contracts to the smaller portion 24$^a$ in an angularly inclined annular surface 44, preferably semi-spherical, against which is placed a sealing ring or washer 46 of this invention having an angular face 48 coinciding with surface 44, heretofore described, and having a flat surface 50 opposite thereto, squarely abutting against an inturned flange 52 formed on the hub 40. In the particular case here illustrated, further packing mechanism 54 and 56 of conventional construction is shown, but this forms no essential part of the invention and may be omitted, without departing from the invention. The washer or ring 46 is preferably provided with circumferential face notches 58 staggered with interior face notches 59. These staggered notches 58 and 59 only extend in opposite directions half way up the face 48 and do not meet each other, from which it follows that oil can flow thru the respective notches to the center of the face 48 and thus lubricates the whole face of the washer and consequently the face 44 of the shaft without letting any gas, such as ammonia, pass thru between the washer and face 54. Similarly opposite, face 50 is provided with notches 60—61 which there operate in the same way. Oil traveling down passages 42 enters chamber 63 from which it has access to the outer circumference of the ring from which it travels, via the notches to lubricate both sides of the ring, while the latter maintains a tight joint as to gas. As the spring mechanism 28 forces the mechanism to the right, it is obvious that the face 44 is forced strongly against the washer and the washer is strongly forced against flange 52 with the result that it is impossible for water or ammonia or anything else in the crank case chamber 12 to get past the ground faces of this washer and escape in the air. As the face 44 of the shaft and the face 48 of the washer is made of angular or semi-spherical shape, it follows that any play of the shaft due to lack of tight fitting adjusts itself on these surfaces and the escape of material from the chamber 12 is prevented.

Having thus described my invention, what I claim as new and desire to secure by Letters Patent, is:—

1. In a machine of the class described, an annular sealing washer having a ground face adapted to bear against a machine part, a set of notches in the interior and exterior circumferences of said washer extending inward along said ground face to approximately the middle of the face of the washer, the respective sets of notches being staggered with reference to each other, and a corresponding set of notches on the opposite face of the washer staggered with reference to the first set for the purposes set forth.

2. In a machine of the class described, an annular sealing washer having two opposite ground faces adapted to bear between machine parts, sets of notches on the interior and exterior circumferences of both said faces of the washer, each such notch extending inward along the adjacent ground face to approximately the middle of that face of the washer, the respective sets of notches being staggered with reference to each other, for the purposes set forth.

In witness whereof, I have hereunto subscribed my name in the presence of two witnesses.

ALFRED O. GIRARD.

Witnesses:
VELMA GRIFFITH,
ANNA R. FRANKLIN.